United States Patent [19]

Akimune et al.

[11] Patent Number: 5,198,165
[45] Date of Patent: Mar. 30, 1993

[54] SINTERED SILICON CARBIDE AND SIALON COMPOSITE

[75] Inventors: Yoshio Akimune; Naoto Hirosaki, both of Yokohama, Japan

[73] Assignee: Nissan Motor Co., Ltd., Yokohama, Japan

[21] Appl. No.: 714,526

[22] Filed: Jun. 13, 1991

[30] Foreign Application Priority Data

Jun. 19, 1990 [JP] Japan .................................. 2-158599

[51] Int. Cl.⁵ ............................................. C04B 35/58
[52] U.S. Cl. ...................................... 264/65; 264/66; 501/89
[58] Field of Search ..................... 264/66, 65; 501/89

[56] References Cited

U.S. PATENT DOCUMENTS

| | | | |
|---|---|---|---|
| 4,296,065 | 10/1981 | Ishii et al. ............................ | 264/325 |
| 4,563,433 | 1/1986 | Yeckley .................................. | 501/97 |
| 4,826,791 | 5/1989 | Mehrotra et al. .................... | 501/89 |
| 5,122,485 | 6/1992 | Akimune .............................. | 264/66 |

OTHER PUBLICATIONS

Government Industrial Research Institute, Kyushu Shuku-machi, Tosu-shi 841 Mitsu Mining Co., Ltd.

Primary Examiner—James Derrington

[57] ABSTRACT

A method for producing a sintered silicon carbide and sialon composite includes the following steps in the sequence: sintering a mixture including α-sialon powder, α-silicon nitride powder and β-silicon carbide powder by hot pressing at a first predetermined temperature; and resintering the sintered mixture at a pressure of nitrogen gas ranging from 100 to 2000 atmosphere and at a second predetermined temperature 100° to 200° C. higher than the first predetermined temperature.

11 Claims, 2 Drawing Sheets

SINTERED SILICON CARBIDE AND SIALON COMPOSITE

BACKGROUND OF THE INVENTION

1. Field of the Invention

The present invention relates to improvements in a method for producing a sintered silicon carbide and sialon composite used for a material of various mechanical parts which require high heat resistance, high corrosion resistance, high strength and low weight.

2. Description of the Prior Art

A variety of methods for producing a sintered silicon carbide (SiC) and sialon composite have been proposed. In those methods, SiC is used to improve sinterability of sialon grains which are in a matrix of the composite and to obtain a sufficiently densified sialon grains thereby obtaining satisfactory mechanical characteristics of the composite.

However, some sintered SiC and sialon composites do not exhibit satisfactory mechanical characteristics. It is considered that SiC grains of those composites are located in the boundary of sialon grains thereby interfering with sintering of sialon grains.

SUMMARY OF THE INVENTION

It is therefore an object of the present invention to provide an improved method of producing a sintered SiC and sialon composite in which SiC grains are located within sialon grains thereby improving sinterability of the sialon grains and obtaining satisfactory mechanical characteristics of the composite.

According to the present invention, there is provided a method for producing a sintered silicon carbide and sialon composite, comprising the following steps in the sequence set forth: sintering a mixture including $\alpha$-sialon powder, $\alpha$-silicon nitride powder and $\beta$-silicon carbide powder by hot pressing at a first predetermined temperature; and resintering the sintered body at a pressure of nitrogen gas ranging from 100 to 2000 atmosphere and at a second predetermined temperature 100° to 200° C. higher than the first predetermined temperature.

By virtue of the resintering following the sintering in the above-mentioned manner, it is made possible to locate $\beta$-SiC grains within sialon grains thereby improving sinterability of sialon grains and obtaining satisfactory mechanical characteristics of the composite.

DETAILED DESCRIPTION OF THE INVENTION

According to the present invention, a method for producing a SiC and sialon composite comprises the following steps in the sequence set forth: sintering a mixture of $\alpha$-sialon powder, $\alpha$-silicon nitride ($Si_3N_4$) powder and $\beta$-SiC powder by hot pressing at a first predetermined temperature; and resintering the sintered mixture at a pressure of $N_2$ gas ranging from 100 to 2000 atm and at a second predetermined temperature 100° to 200° C. higher than the first predetermined temperature. Yttrium oxide ($Y_2O_3$) as a sintering aid is contained in amount of 8 wt % in a commercial $\alpha$-sialon powder. If it is necessary, sintering aids besides $Y_2O_3$ are mixed with the mixture of $\alpha$-sialon powder, $\alpha$-$Si_3N_4$ powder and $\beta$-SiC powder.

It is preferable that hot press sintering is carried out at a temperature in the range from 1700° C. to 1750° C.

If the second temperature is not higher than the first predetermined temperature by 100° C. or more, the growth of sialon grains becomes insufficient to locate $\beta$-SiC grains within sialon grains. Therefore, hardness of the composite is lowered. On the other hand, if the second predetermined temperature is higher than the first predetermined temperature by more than 200° C., the size of sialon grains becomes too large, thereby lowering hardness of the composite.

If the pressure of $N_2$ gas is lower than 100 atm, secondary grain growth of sialon will not occur so that $\beta$-SiC grains remain at the boundary of sialon grains, thereby lowering sinterability of sialon grains. On the other hand, if the pressure of $N_2$ gas is higher than 2000 atm, it is possible that an apparatus in which resintering takes place is damaged.

It is preferable that the proportion of $\alpha$-sialon powder to $\alpha$-$Si_3N_4$ powder is in the range from 20:80 to 50:50 by weight, and the proportion of the total of $\alpha$-sialon powder and $\alpha$-$Si_3N_4$ powder to $\beta$-SiC powder is in the range from 80:20 to 95:5 by volume. By these proportions, it is made possible to obtain a satisfactory sinterability of sialon grains.

According to the production method of the present invention, a mixture of $\alpha$-sialon powder, $\alpha$-$Si_3N_4$ powder and $\beta$-SiC powder is sintered by hot pressing to produce a sintered composite. By this hot press sintering, $\alpha$-sialon powder changes to sintered $\alpha$-sialon grains. A part of $\alpha$-$Si_3N_4$ powder is transformed into $\beta$-$Si_3N_4$ and then into sintered $\beta$-sialon grains, while the rest of $\alpha$-$Si_3N_4$ powder is transformed into sintered $\alpha$-sialon grains. $\beta$-SiC becomes to be located at boundaries of $\alpha$-sialon and $\beta$-sialon grains.

Figure 1:
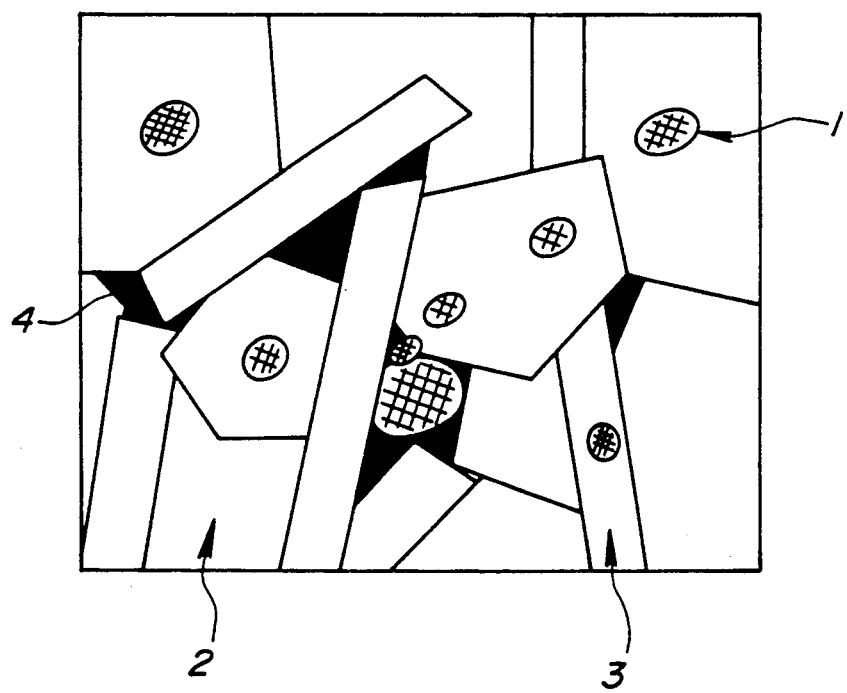
FIG. 1 is a schematic enlarged illustration of the structure of a sintered SiC and sialon composite produced according to a production method of the present invention.

The sintered composite is resintered, by which $\beta$-SiC 1 is taken and located within $\alpha$-sialon and $\beta$-sialon grains 2 and 3 through the growth of $\alpha$-sialon and $\beta$-sialon grains 2 and 3, as is seen from FIG. 1 which is a schematic microscopic illustration of the resintered composite. Thus, the resintered composite is sufficiently densified thereby having high hardness, high strength and high toughness. The reference numeral 4 in FIG. 1 denotes a glass phase at the grain boundary.

In order to evaluate the production method of the sintered SiC and sialon composite according to the present invention, Examples will be discussed in comparison with Comparative Examples, referring to Table 1.

EXAMPLE

EXAMPLES 1-4

First, as is seen from Table 1, base powder was prepared by mixing 40% by weight of $\alpha$-sialon powder, and 60% by weight of $\alpha$-$Si_3N_4$ powder. The thus prepared base powder was mixed in amounts of 90% by volume with $\beta$-SiC powder which was in amounts of 10% by volume and had an average particle size of 0.28 $\mu$m, in ethanol by using a ball mill for 24 hours. After drying, a mixture powder was sintered by hot pressing at a compression pressure of 250 kgf/cm$^2$, in the atmosphere of N$_2$ gas at a pressure of 1 atm, at a temperature of 1700° C. for a time of 30 minutes. Then, the sintered composite was subjected to a resintering by hot isostatic pressing (HIP) at temperatures of 1800° C. (Examples 1, 2 and 3) and 1900° C. (Example 4) for a time of 1 hour, in the atmosphere of N$_2$ gas at pressures of 100 atm (Example 1), 1000 atm (Examples 2 and 4) and 2000 atm (Example 3).

Figure 2:
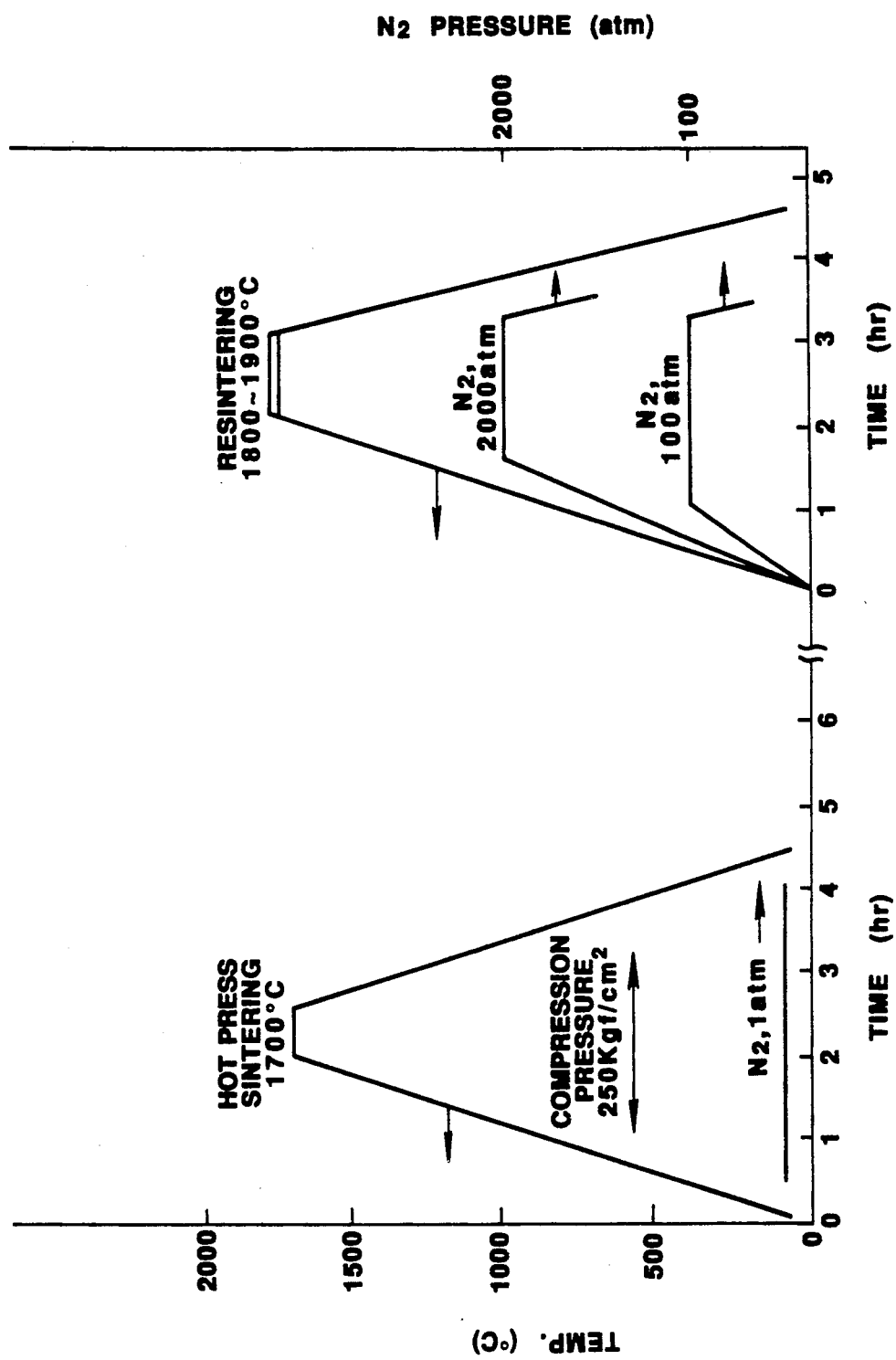
FIG. 2 is a graph showing patterns of heat press sintering and resintering in terms of sintering temperature and nitrogen ($N_2$) gas pressure, employed in Examples of the present invention.

The variations of the temperatures and the atmospheres in the above-mentioned hot press sintering and the resintering by HIP in terms of elapsed time are shown in the graph of FIG. 2.

Then, a variety of tests were conducted on the resultant sintered composites to get mechanical characteristic values of them. First, the density of each of the sintered composites was measured. The results are shown in Table 1 from which it was confirmed that the sintered composites of Examples 1 to 4 respectively had high densities ranging from 3.23 to 3.25 g/cm$^3$.

Additionally, the crystal phase of each of the obtained sintered composites was examined. As a result, it was confirmed that each sintered composite contained, as main components, α-sialon, β-sialon and β-SiC which is located within α-sialon and β-sialon.

Furthermore, each of the sintered composites was subjected to tests to measure a flexural strength ($\sigma f$), a fracture toughness (KIC), and a hardness (Hv). The flexural strength ($\sigma f$) was measured by a so-called four point bending test according to Japanese Industrial Standard R1601. The results of these tests are shown in Table 1. It was confirmed that the sintered composites of Examples 1 to 4 respectively had high flexural strengths ($\sigma f$) ranging from 750–860 MPa, high fracture toughnesses (KIC) ranging from 5.0–5.2 MPa$\sqrt{m}$ and high hardnesses (Hv) ranging from 24.0–25.5 GPa. Thus, the sintered composites had satisfactory characteristics in both toughness and hardness.

COMPARATIVE EXAMPLE 1

As is seen from Table 1, a mixture was prepared by mixing 40% by weight of α-sialon powder and 60% by weight of α-Si$_3$N$_4$ powder in ethanol by using a ball mill. After drying, the mixture was subjected to a so-called pressureless sintering at a temperature of 1700° C. for a time of 3 hours, in the atmosphere of N$_2$ gas at a pressure of 1 atm to obtain a sintered body.

Then, the same tests as those in Examples 1–4 were conducted on the thus obtained sintered body in order to get the mechanical characteristic values of them. The test results demonstrate that the resultant sintered body was inferior in hardness (Hv).

COMPARATIVE EXAMPLE 2

A sintered body of Comparative Example 2 was produced by a similar method to that in Comparative Example 1 with the exception that a mixture of α-sialon powder and α-Si$_3$N$_4$ was mixed in an amount of 90% by volume with β-SiC powder which was in an amount of 10% by volume.

The results of the same tests as those in Examples 1–4 with the exception that fracture toughness (KIC) test was not conducted demonstrate that the resultant sintered body was not sufficiently sintered and thus was really inferior in flexural strength ($\sigma f$) and hardness (Hv). The fracture toughness (KIC) test could not be conducted by using a microscope because of density of the sintered body was not more than 3 g/cm$^3$.

COMPARATIVE EXAMPLE 3

A sintered body of Comparative Example 3 was produced by a similar method to that in Example 1–4 with the exception that resintering was not conducted.

The results of the same tests as those in Examples 1–4 demonstrate that the sintered body was inferior in flexural strength ($\sigma f$), fracture toughness (KIC) and hardness (Hv).

COMPARATIVE EXAMPLE 4

A sintered body of Comparative Example 4 was produced by a similar method to that in Example 1–3 with the exception that resintering was conducted in the atmosphere of N$_2$ gas at pressure of 10 atm.

The results of the same tests as those in Examples 1–4 demonstrate that the resultant sintered body was inferior in flexural strength ($\sigma f$), fracture toughness (KIC) and hardness (Hv).

COMPARATIVE EXAMPLES 5 and 6

Sintered bodies of Comparative Examples 5 and 6 were produced by similar methods to those in Example 2 and 4 with the exception that resinterings were conducted at temperatures of 1750° C. and 1950° C. in Comparative Examples 5 and 6, respectively.

The results of the same tests as those in Examples 1–4 demonstrate that the sintered bodies were inferior in flexural strength ($\sigma f$) and hardness (Hv).

TABLE 1

| | | Comparative Example 1 | Comparative Example 2 | Comparative Example 3 | Comparative Example 4 | Example 1 | Example 2 |
|---|---|---|---|---|---|---|---|
| Powder mixture | α-sialon (wt %) | 40 | 40 | 40 | 40 | 40 | 40 |
| | α-Si$_3$N$_4$ (wt %) | 60 | 60 | 60 | 60 | 60 | 60 |
| | β-SiC (vol %) | — | 10 | 10 | 10 | 10 | 10 |
| | β-SiC particle size (μm) | — | 0.28 | 0.28 | 0.28 | 0.28 | 0.28 |
| Sintering | Method | Atmospheric pressure | Atmospheric pressure | Hot pressing | Hot pressing | Hot pressing | Hot pressing |
| | Atmosphere | N$_2$, 1 atm | N$_2$, 1 atm | N$_2$, 1 atm | N$_2$, 1 atm | N$_2$, 1 atm | N$_2$, 1 atm |
| | Temp. (°C.) | 1700 | 1700 | 1700 | 1700 | 1700 | 1700 |
| | Time (hr) | 3 | 3 | 0.5 | 0.5 | 0.5 | 0.5 |
| Resintering | Method | — | — | — | HIP | HIP | HIP |
| | Atmosphere | — | — | — | N$_2$, 10 atm | N$_2$, 100 atm | N$_2$, 1000 atm |
| | Temp. (°C.) | — | — | — | 1800 | 1800 | 1800 |
| | Time (hr) | — | — | — | 1 | 1 | 1 |
| Density (g/cm$^3$) | | 3.22 | 2.50 | 3.20 | 3.24 | 3.23 | 3.24 |
| Crystal phase | | α-sialon β-sialon | Not sintered | α-sialon β-sialon β-SiC | α-sialon β-sialon β-SiC | α-sialon β-sialon β-SiC | α-sialon β-sialon β-SiC |
| Flexural strength of (MPa) | | 750 | 200 | 700 | 700 | 750 | 820 |

TABLE 1-continued

| | | | | | |
|---|---|---|---|---|---|
| Fracture toughness KIC (MPa√m) | 5.0 | — | 4.8 | 4.7 | 5.0 | 5.2 |
| Hardness Hv (GPa) | 18.9 | 5.0 | 21.0 | 21.0 | 24.0 | 24.0 |

| | | | Example 3 | Comparative Example 5 | Example 4 | Comparative Example 6 |
|---|---|---|---|---|---|---|
| Powder mixture | α-sialon (wt %) | | 40 | 40 | 40 | 40 |
| | α-Si$_3$N$_4$ (wt %) | | 60 | 60 | 60 | 60 |
| | β-SiC (vol %) | | 10 | 10 | 10 | 10 |
| | β-SiC particle size (μm) | | 0.28 | 0.28 | 0.28 | 0.28 |
| Sintering | Method | | Hot pressing | Hot pressing | Hot pressing | Hot pressing |
| | Atmosphere | | N$_2$, 1 atm | N$_2$, 1 atm | N$_2$, 1 atm | N$_2$, 1 atm |
| | Temp. (°C.) | | 1700 | 1700 | 1700 | 1700 |
| | Time (hr) | | 0.5 | 0.5 | 0.5 | 0.5 |
| Resintering | Method | | HIP | HIP | HIP | HIP |
| | Atmosphere | | N$_2$, 2000 atm | N$_2$, 1000 atm | N$_2$, 1000 atm | N$_2$, 1000 atm |
| | Temp. (°C.) | | 1800 | 1750 | 1900 | 1950 |
| | Time (hr) | | 1 | 1 | 1 | 1 |
| Density (g/cm$^3$) | | | 3.25 | 3.25 | 3.25 | 3.20 |
| Crystal phase | | | α-sialon β-sialon β-SiC | α-sialon β-sialon β-SiC | α-sialon β-sialon β-SiC | α-sialon β-sialon β-SiC |
| Flexural strength of (MPa) | | | 860 | 740 | 850 | 740 |
| Fracture toughness KIC (MPa√m) | | | 5.2 | 5.0 | 5.2 | 5.0 |
| Hardness Hv (GPa) | | | 25.5 | 21.0 | 24.5 | 22.0 |

What is claimed is:

1. A method for producing a sintered silicon carbide and sialon composite, comprising the following steps in the sequence set forth:
   sintering a mixture including α-sialon powder, α-silicon nitride powder and β-silicon carbide powder by hot pressing at a first predetermined temperature; and
   resintering the sintered mixture at a pressure of nitrogen gas ranging from 100 to 2000 atmosphere and at a second predetermined temperature 100° to 200° C. higher than said first predetermined temperature.

2. A method as claimed in claim 1, in which said first predetermined temperature is in the range from 1700° C. to 1750° C.

3. A method as claimed in claim 1, in which said sintering is carried out in atmosphere of nitrogen gas at a pressure of 1 atmosphere.

4. A method as claimed in claim 1, in which said hot pressing is carried out at a compression pressure of about 250 kgf/cm$^2$.

5. A method as claimed in claim 1, in which said resintering is carried out by hot isostatic pressing.

6. A method as claimed in claim 1, in which said α-sialon powder contains about 8% by weight of yttrium oxide as a sintering aid.

7. A method as claimed in claim 6, in which the proportion of said α-sialon powder to said α-silicon nitride powder is in the range from 20:80 to 50:50 by weight.

8. A method as claimed in claim 7, in which the proportion of said α-sialon powder to said α-silicon nitride powder is about 40:60 by weight.

9. A method as claimed in claim 1, in which the proportion of the total of said α-sialon powder and said α-silicon nitride powder to said β-silicon carbide powder is in the range from 80:20 to 95:5 by volume.

10. A method as claimed in claim 9, in which the proportion of the total of said α-sialon powder and said α-silicon nitride powder to said β-silicon carbide powder is about 90:10 by volume.

11. A method as claimed in claim 1, in which said β-silicon carbide has an average particle size of about 0.28 μm.

* * * * *